US006574551B1

(12) United States Patent
Maxwell et al.

(10) Patent No.: US 6,574,551 B1
(45) Date of Patent: Jun. 3, 2003

(54) AUTOSCALING OF RECOMMENDED ROUTE

(75) Inventors: Kenneth G. Maxwell, Port Huron, MI (US); Jeffrey A. Millington, Rochester Hills, MI (US)

(73) Assignee: Magellan DIS, Inc., Rochester Hills, MI (US)

( * ) Notice: Subject to any disclaimer, the term of this patent is extended or adjusted under 35 U.S.C. 154(b) by 408 days.

(21) Appl. No.: 09/099,963

(22) Filed: Jun. 19, 1998

Related U.S. Application Data
(60) Provisional application No. 60/084,228, filed on May 5, 1998.

(51) Int. Cl.⁷ .............................................. G01C 21/30
(52) U.S. Cl. ..................... 701/209; 701/208; 701/212; 701/214; 340/988; 340/990
(58) Field of Search ................ 701/200, 201, 701/207, 208, 211, 212, 214, 209; 340/988, 990, 995; 73/178 R

(56) References Cited

U.S. PATENT DOCUMENTS

| | | | | |
|---|---|---|---|---|
| 5,121,326 A | * | 6/1992 | Moroto et al. | 701/212 |
| 5,359,527 A | * | 10/1994 | Takanabe et al. | |
| 5,371,497 A | * | 12/1994 | Nimura et al. | 304/995 |
| 5,497,149 A | * | 3/1996 | Fast | 340/988 |
| 5,689,252 A | * | 11/1997 | Ayanoglu et al. | |
| 5,774,073 A | * | 6/1998 | Maekawa et al. | |
| 5,902,349 A | * | 5/1999 | Endo et al. | |
| 5,951,622 A | * | 9/1999 | Nomura | 701/212 |
| 6,049,753 A | * | 4/2000 | Nimura | 701/201 |

FOREIGN PATENT DOCUMENTS

| | | |
|---|---|---|
| DE | 9516647 | 11/1996 |
| EP | 0720003 | 7/1996 |
| JP | 8069515 | 3/1996 |
| JP | 8305283 | 11/1996 |

OTHER PUBLICATIONS

Magellan, Magellan PathMaster Turn–by–turn route Guidance & Driver Information System, pp. 1–4.

* cited by examiner

Primary Examiner—Gertrude Arthur
(74) Attorney, Agent, or Firm—Carlson, Gaskey & Olds, P.C.

(57) ABSTRACT

A navigation system is used to assist a user in proceeding from a current location to a desired destination. The navigation system includes a processor for storing a database of roads and a system for determining the current position of a vehicle in relation to the database. A user can select a desired destination in the database by using an input device which sends the selection to the processor. The navigation system determines a route to the selected destination. An output device displays the route and the vehicle's current position by automatically scaling the display to include the route and the current position.

23 Claims, 1 Drawing Sheet

AUTOSCALING OF RECOMMENDED ROUTE

This application claims priority to U.S. Provisional Application Serial No. 60/084,228 filed on May 5, 1998.

BACKGROUND OF THE INVENTION

This present invention relates to navigation systems and more particularly to a navigation system with a vehicle location display for showing a vehicle's current location and the location of the desired route.

Navigation systems generally provide a recommended route from a starting point to a desired location. Generally, the starting point and desired location are selected from a large database of roads stored in a mass media storage, such as a CD ROM, which includes the roads in the area to be traveled by the user. The navigation system can be located in a personal computer or it can be installed in a vehicle. If the navigation system is installed in a vehicle, the starting point is typically the current position of the vehicle, which can be entered into the navigation system by an associated position determining system that usually includes a Global Positioning System (GPS) receiver.

The navigation system determines a route from the starting point to the destination utilizing an algorithm well-known to those in the art and currently in use in many navigation systems. Usually there are many potential routes between the selected starting point and the desired destination. Typical navigation systems select a recommended route based upon certain predetermined criteria including the length of the route and the estimated time of travel on the route. Depending upon the predetermined algorithm of the navigation system, the navigation system will recommend the route with the shortest total length, the lowest total time, or some weighted average of length and time.

The recommended route is then displayed to the user as a map showing the starting point, desired destination and highlighting the recommended route. Preferably, if the navigation system is installed in a vehicle, the navigation system displays the current location of the vehicle and provides turn-by-turn instructions to the driver, guiding the driver to the selected destination along the recommended route.

The typical navigation system provides the current vehicle location to the user by displaying either a textual guidance mode screen having a set of instructions and the current location or a guidance mode map showing the starting point, desired destination, current location and highlighting the recommended route.

One disadvantage with current displays is that the present location of the vehicle and the starting point of the recommended route may not be able to be seen on the display screen at the same time. This can occur in a situation where the vehicle is moving while the route is being determined and the current position of the vehicle and the nearest point on the recommended route can no longer be in the same screen due to the current display scale. This makes it difficult for the user to proceed to the starting point of the recommended route. Some map displays permit the user to select a viewing scale to aid the driver in showing his current position in relation to the starting point of the recommended route, but this requires further input from the user while the user is en route. Accordingly, it is desirable to provide a vehicle location display that automatically scales the display to show a vehicle's current location and the starting point of a recommended route on the same screen.

SUMMARY OF THE INVENTION

In general terms, this invention provides a vehicle location display for a navigation system. The vehicle location display displays the current vehicle location on a display device of a navigation system in a graphical display mode. In the graphical display mode, the display displays a map having the current location of the vehicle. The navigation system includes a database of roads and a system for determining the current position of a vehicle in relation to the database. A user can select a desired destination in the database by using an input device connected to the navigation system. The navigation system also includes a system for determining a route to the destination. A display displays the route and the vehicle's current position by automatically scaling the display to include the route and the current position.

These and other features and advantages of the present invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
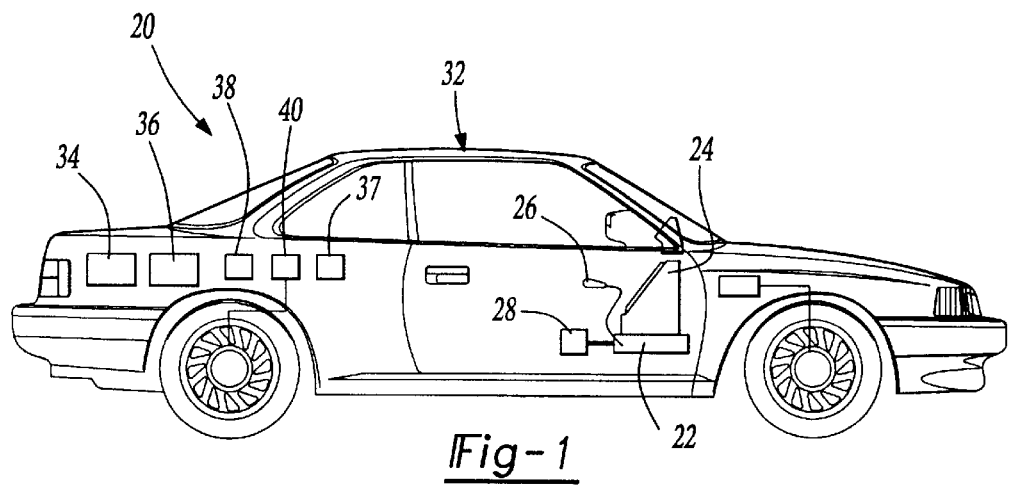
FIG. 1 is a schematic of the navigation system of the present invention.

The navigation system 20 of the present invention is shown schematically in FIG. 1. The navigation system 20 includes a central processor unit (CPU) 22 connected to a display 24, such as a high resolution LCD or flat panel display. The CPU 22 is also connected to an input device 26 such as a mouse, keyboard, key pad, or remote device. Alternatively, the display 24 can be a touch screen display. The navigation system 20 further includes a storage device 28, such as a hard drive 28 or a CD ROM, connected to the CPU 22. The storage device 28 contains a database including a map of all roads in the area to be traveled by the vehicle 32 and may contain the software for the CPU 22, including the graphical user interface, route guidance, operating system, position-determining software, etc.

The navigation system preferably includes position and motion determining devices, such as a GPS receiver 32, a gyroscope 36, a compass 38, a wheel speed sensor 40, and an orthogonal multiple axis accelerometer 41 all connected to the CPU (connections not shown for simplicity). Such position and motion determining devices are well known and are commercially available.

The navigation system 20 determines the position of the vehicle 32 relative to the database of roads utilizing the position and motion determining devices. The driver selects a destination relative to the database of roads utilizing the user input device 26 and the display 24. The navigation system 20 then displays turn-by-turn instructions to the driver to guide the driver to the desired destination from the resent position.

Figure 2:
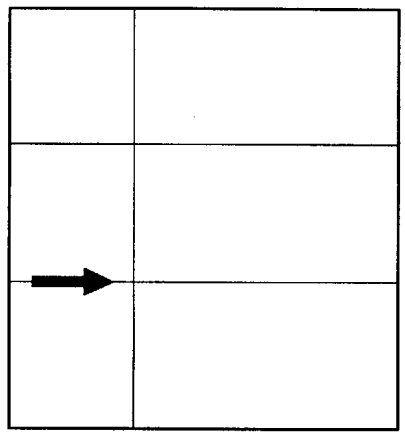
FIG. 2 illustrates an example of a display showing a current location.

Often the navigation system 20 is determining or calculating a route while the vehicle 32 is moving. In some situations, the current location of the vehicle 32 may not be near the recommended starting point of the route, such as when the vehicle is in a parking lot, on a new street, or on a small side street that is not included in the database of roads, for example. Alternatively, the recommended starting point of the route may be at a point that the vehicle has already passed. If the vehicle is not on the recommended route when the route calculation is finished, the display 24 displays a map showing the recommended route and the current vehicle position on the map. The display 24 also includes an instruction instructing the driver to proceed to the route. Since the vehicle 32 may have been moving while the route was being calculated, the current position of the vehicle and the nearest point on the recommended route may no longer be in the same screen, depending upon the current display scale, as shown in FIG. 2. FIG. 2 shows a vehicle's current position, indicated by the arrow, on a map scale that does not show the starting point of the recommended route.

Figure 3:
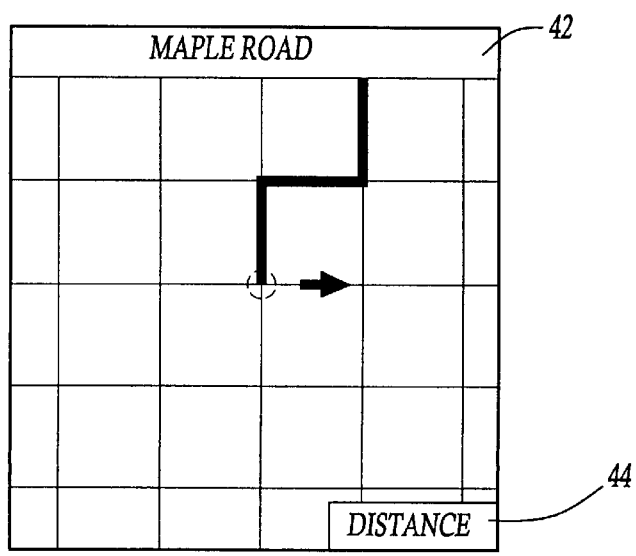
FIG. 3 illustrates an example of a display showing the present location and a desired route to a predetermined destination.

In the present invention, when the route calculation is completed, the display 24 automatically scales the display of the map, as shown in FIG. 3, so that the nearest point on a recommended route and the current position of the vehicle 32 are both shown on the display 24. FIG. 3 shows the display 24 when the navigation system 20 has automatically scaled the display 24 to simultaneously show the vehicle's current position and the starting point of the recommended route. The current position of the vehicle is represented by the arrow and the recommended route is shown as highlighted with a thicker line. There is also a current street field 42 which displays the name of the street on which the vehicle is currently positioned.

The navigation system 20 also determines a distance from the current position to the nearest point on the recommended route and displays this distance on the display 24 so the driver knows how far he is from the starting point of the route. This distance can be communicated to the driver by either or all of the following ways: by a textual display, by an audible indication, or by a graphical display. For example, the display 24 could have a distance field 44 displaying how far the vehicle 32 is from the recommended route, as shown in FIG. 3.

As previously mentioned, the navigation system 20 is often calculating the route while the vehicle 32 is moving. In this situation, the navigation system 20 first determines the current position of the vehicle with respect to the database of roads. Once the recommended route has been calculated, the navigation system 20 then determines a second position, i.e. the new current position, of the vehicle with respect to the database of roads because the vehicle has changed its location since the first position, i.e. the original current position, was determined. The display is then automatically scaled to show the new current position of the vehicle and the nearest point of the recommended route. Thus, the navigation system 20 is determining the route based on the first or original position of the vehicle when the destination was selected and is automatically scaling the display to show both the nearest point of the recommended route and the second or new current position of the vehicle. The navigation system determines the distance from the second or new current vehicle position to the route and displays this distance in the distance field 44 on the display 24.

As shown in FIG. 3, the first or original position of the vehicle when the destination was selected is shown as a dashed circle while the second or new current position is shown as the arrow. The prior location of the vehicle, shown by the dashed circle is not typically part of the display 24 but is only used to illustrate that the vehicle has changed its location from when the destination was originally selected and when the navigation system 20 has completed calculating the route.

If the vehicle is moving when the route is calculated, the display 24 may have to be automatically scaled again after the initial display of the route. If the vehicle is moving away from the route, it may be necessary to zoom out after the initial display of the route in order to maintain the route on the display. Similarly, if the vehicle is moving toward the route after the initial display of the route, the display may zoom in to display the current location of the vehicle and the route.

The inventive method for automatically scaling the display 24 for the navigation system 20 includes the following steps: (a) determining a first position relative to a database of roads; (b) selecting a destination in the database; (c) calculating a route to the destination in the database; (d) calculating a map scale including the route and the first position; and (e) displaying the route and the first position based on the map scale.

If the recommended route and the first position are not viewable on the display at the same time, a first map scale is displayed prior to step (e) and a second map scale, different from the first map scale, is displayed during step (e).

Additionally, if the vehicle 32 is moving when the destination is selected, the method includes the steps of determining a second position relative to the database, the second position being different than the first position, and calculating the map scale based on the second position. The first position is the location of the vehicle when the destination is selected and the second position is the location of the vehicle once the navigation system 20 has determined the route to the desired destination.

Also, the method includes the step of determining a distance from the first position to the nearest point on the route when the vehicle is stationary or determining a distance from the second position to the nearest point on the route when the vehicle is moving. This distance is also displayed on the display 24 along with the vehicle's current position and the nearest point of the recommended route.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A navigation system comprising:
   a database of roads;
   a system for determining a position of the navigation system relative to the database;
   a system for determining a route to a destination in said database;
   a display for displaying said route and said position, said display automatically scaling said display to include said route and said position when said position is not on said route; and
   means for determining a distance from said position to said route wherein said display displays said distance when said position is not on said route.

2. A navigation system of claim 1 wherein said position includes at least a first position and a second position, said system for determining said route based on said first position and said display being automatically scaled to display said route and said second position, said first position being different than said second position.

3. A navigation system of claim 2 wherein said first position is a location of a vehicle when said destination is selected and said second position is a location of the vehicle when said system for determining said route has completed determining said route to said destination.

4. A navigation system of claim 2 further wherein said second position is not on said route.

5. The navigation system of claim 1 wherein the means for determining a distance determines the distance from the position to a nearest point on the route.

6. A navigation system comprising:
   a database of roads;
   a system for determining a position of the navigation system relative to the database;
   a system for determining a route to a destination in said database;
   a display for displaying said route and said position, said display automatically scaling said display to include said route and said position wherein said position includes at least a first position comprising a location of a vehicle when said destination is selected and a second position comprising a location of the vehicle when said system for determining said route has completed determining said route to said destination and wherein said system for determining said route is based on said first position and said display is automatically scaled to display said route and said second position, said first position being different than said second position, and wherein said second position is not on said route; and
   means for determining a distance from said second position to said route wherein said display displays said distance.

7. The navigation system of claim 6 wherein the means for determining a distance determines the distance from the second position to a nearest point on the route.

8. A method for automatically scaling a display for a navigation system including the steps of:
   (a) determining a first position of the display relative to a database of roads;
   (b) selecting a destination in the database;
   (c) calculating a route to the destination in the database;
   (d) calculating a map scale including said route and said first position when the first position is not on said route;
   (e) displaying said route and said first position based on said map scale when said first position is not on said route; and
   (f) determining a distance from said route to said first position and displaying said distance.

9. The method of claim 8 further including the step of determining a second position relative to the database wherein said first position is different than said second position such that said first position corresponds to a first location of a vehicle when the destination is selected and said second position corresponds to a second location of the vehicle once said route has been calculated.

10. The method of claim 8 wherein said step (f) includes the step of determining the distance between the first position and a nearest point on the route.

11. A method for automatically scaling a display for a navigation system including the steps of:
   (a) determining a first position of the display relative to a database of roads;
   (b) selecting a destination in the database;
   (c) calculating a route to the destination in the database;
   (d) calculating a map scale including said route and said first position;

(e) determining a second position relative to the database wherein said first position is different than said second position such that said first position corresponds to a first location of a vehicle when the destination is selected and said second position corresponds to a second location of the vehicle once said route has been calculated;
   (f) determining said route based on said first position and calculating said map scale based on said second position;
   (g) displaying said route and said second position based on said map scale.

12. The method of claim 11 further including the step of displaying said route and said second position based on said map scale.

13. The method of claim 11 further including the step of determining a distance from said route to said second position and displaying said distance.

14. The method of claim 11 further including the steps of:
   (h) displaying at a first map scale prior to said step (g), and
   (i) displaying at a second map scale different from said first map scale during said step (g).

15. The method of claim 11 wherein the second position is not on the route.

16. A navigation system comprising:
   an input device for selecting a desired destination;
   a processor for storing a database of roads and for receiving input from said input device;
   a system for determining a first position of the navigation system relative to the database;
   a system for calculating a route to the desired destination in the database;
   means for calculating a map scale that includes said route and said first position when said first position is not on said route;
   an output device for displaying said route and said first position when said first position is not on said route, said output device being automatically scaled to display said route and said first position simultaneously; and
   means for determining a distance from said first position to said route, said distance being displayed via said output device with said route and said first position.

17. A navigation system of claim 16 further including means for determining a second position relative to the database wherein said first position is different than said second position such that said first position corresponds to a first location of a vehicle when the destination is selected and said second position corresponds to a second location of the vehicle once said route has been calculated.

18. A method for automatically scaling a display for a navigation system including the steps of:
   determining a first position of the navigation system relative to a database of roads;
   calculating a route in the database;
   calculating a second position of the navigation system relative to the database of roads, subsequent to the first position;
   determining a map scale which would ensure that the route and first position can both be displayed simultaneously;
   changing the map scale to ensure that the route and second position can both be displayed simultaneously; and
   displaying said route and said second position based on said map scale.

19. The method of claim 18 wherein the second position is not on the route.

20. A navigation system comprising:

an input device for selecting a desired destination;

a processor for storing a database of roads and for receiving input from said input device;

a system for determining a first position of the navigation system relative to the database;

a system for calculating a route to the desired destination in the database;

means for determining a second position relative to the database wherein said first position is different than said second position such that said first position corresponds to a first location of a vehicle when the destination is selected and said second position corresponds to a second location of the vehicle once said route has been calculated;

an output device for displaying said route and said second position, said output device being automatically scaled to display said route and said second position simultaneously wherein said system for calculating said route calculates said route based on said first position and said output device is automatically scaled to display said route and said second position.

21. A navigation system of claim 20 further including means for calculating a map scale that includes said route and said second position.

22. A navigation system of claim 21 further including means for determining a distance from said second position to said route, said distance being displayed via said output device with said route and said second position.

23. The navigation system of claim 20 wherein the second position is not on the route.

* * * * *